INVENTOR
Hans-Peter Klose

Dec. 13, 1966 HANS-PETER KLOSE 3,291,088

MULTI-PURPOSE BOAT

Filed Oct. 24, 1965 8 Sheets-Sheet 2

INVENTOR

Hans Peter Klose

Dec. 13, 1966 HANS-PETER KLOSE 3,291,088

MULTI-PURPOSE BOAT

Filed Oct. 24, 1965 8 Sheets-Sheet 3

INVENTOR

Hans-Peter Klose

INVENTOR
Hans-Peter Klose

INVENTOR
Hans-Peter Klose

Dec. 13, 1966 HANS-PETER KLOSE 3,291,088

MULTI-PURPOSE BOAT

Filed Oct. 24, 1965 8 Sheets-Sheet 6

INVENTOR

Hans-Peter Klose

Dec. 13, 1966 HANS-PETER KLOSE 3,291,088

MULTI-PURPOSE BOAT

Filed Oct. 24, 1965 8 Sheets-Sheet 7

INVENTOR

Hans-Peter Klose

BY

ATTORNEY

Dec. 13, 1966 HANS-PETER KLOSE 3,291,088

MULTI-PURPOSE BOAT

Filed Oct. 24, 1965 8 Sheets-Sheet 8

INVENTOR

Hans-Peter Klose

United States Patent Office 3,291,088
Patented Dec. 13, 1966

3,291,088

MULTI-PURPOSE BOAT

Hans-Peter Klose, 9326 Campbell Road, Vienna, Va.

Filed Oct. 24, 1965, Ser. No. 504,376
11 Claims. (Cl. 114—39)

This application is a continuation-in-part of my copending application Serial No. 282,900, filed May 24, 1963.

This invention relates to a multi-purpose boat which may be used equally effectively as a sailboat, a kayak, a canoe, a rowboat or an outboard motorboat. Each of these boat types differs usually in its individual basic shape and waterline. The main element of this invention is a single planing hull design with considerations for each one of the said five purposes, giving good hydrodynamic results, more safety provisions and more practical usefulness for each application. The advantage of each single boat type, being considered in this invention, is added to every one of the other conversions desired to be used. The change from one use to the other is quickly and easily performed by use of a minimum of readily interchangeable accessories.

The primary object of this invention is to provide a well balanced and dry lightweight and portable single hull multipurpose boat with high performance, requiring a minimum of effort to use it, a boat that offers more safety than in ordinary narrow beam boats, more conveniences than in ordinary small boats and more usefulness than any known comparable single or multi-purpose boat has, while at the same time being economical to construct and maintain.

As a planing, sloop rigged sailboat, it offers good proportions in the hull design, to make it fast, safe and easy to handle. Positioning the passenger's weight to a convenient location near the center thwart results in the transom clearing the water for best hydrodynamic results. The steering control in this position is operated either by a conventional tiller or convenient control handles.

The forward location of the daggerboard trunk inside the thwart, the location of the aft thwart at the transom between the coaming, and the fair line of the rather high coaming which is close to the rubrail, create additional room in the main cockpit for 1 to 4 passengers. This space is free of fixtures on the sides of floor such as blocks, cleats or hiking straps. When hiking, the feet hook under the opposite coaming, resting against the longitudinal buoyancy compartment between deck and hull bottom. When capsized, said compartments result in lift like two pontoons, one on each side, to keep the boat well balanced for continuation of sailing, even before the water is drained out. The placement of additional foam in the bottom of the hull raises the hull high enough to cause the water to drain out automatically through openings provided in the hull. An additional cockpit is located forward of the mainthwart as an ideal position for small children, to be out of the way of the sailing activity which is performed within the main cockpit. The high coaming protects children against splash water and gives them means to hold on to when the boat heels. The coaming is also the base for a windshield, which is fastened to said coaming in front, at its outside, as an extension of the present coaming, if desired. The forward cockpit also provides an ideal position for observing other boats or particles in the water ahead of the boat, thus ordinarily difficult because of the position of the jib sail, or main sail. Positioning of the mast is done by placing said mast through an opening in the center thwart, forward of the daggerboard trunk, onto the floor. Three stays simply hook it in place. The daggerboard and rudder simply slip into position.

As a kayak this boat has a maximum touring kayak beam extending over a greater length than in ordinary kayaks, thus making it highly stable and buoyant for more loading capacity. The longer open cockpit of this invention offers easier access to and room for more passengers than the ordinary two-men kayak. Foot steering controls are provided to be hooked up to the control cable running inside the coaming. Back rests can be inserted into provided openings longside the inner part of the coaming.

As a canoe this hull turns faster than the ordinary canoe because of the flat stern and flat bottom. The two thwarts provide a convenient seating arrangement, if desired, for two passengers next to each other on the center thwart. This invention has a much greater stability and loading capacity than the ordinary canoe.

As a rowboat the advantage of this invention for speed in comparison with ordinary rowboats is obvious because of its long, narrow and flat hull design. The draft is less than 4% of the center water line length when floating unloaded. The transom clears the water surface when the boat is rowed. The operator sits on the center thwart, which is much wider than in ordinary rowboats. The two detachable buoyant oarlock assemblies fit over the coaming and are held tight in place by ordinary exchangeable suction cups, which stick to the deck. These assemblies offer the maximum in rowing power. A built-in bait box is provided for fishermen. This bait box is insulated by the same foam as is used in the sandwich construction, to keep bait alive and canned food cool and operates through the motion of the boat by water entering through an opening in the hull or daggerboard trunk and draining through a similar opening on the opposite side. One or two boxes are positioned under deck or under the thwart to be out of sight, with a lid on top.

As an outboard motorboat this invention presents a wide flat transom for support of the motor with good hydrodynamic results. Two steering control means are available, one by stering the motor directly, when it is mounted to the transom, the other by mounting an adjustable steering wheel to the inside of the forward coaming of the boat. To provide a lightweight transom with maximum strength, the coaming meets the upper section of the transom extension to form a brace. This upward extension is less than half as wide as the total transom. It provides a standard transom height and also forms a back rest for the aft thwart.

Other objects and advantages of this invention will be apparent upon consideration of the following detailed description of a preferred embodiment thereof in conjunction with the annexed drawings wherein:

FIGURE 10 is a sectional side view showing the seating of two passengers when the boat is being used as a kayak;

FIGURE 11 is a sectional end view showing the position of a kayak paddler and the back rest in relation to the paddler;

Figures 9, 10, 11, 12, 13, 14, 15:
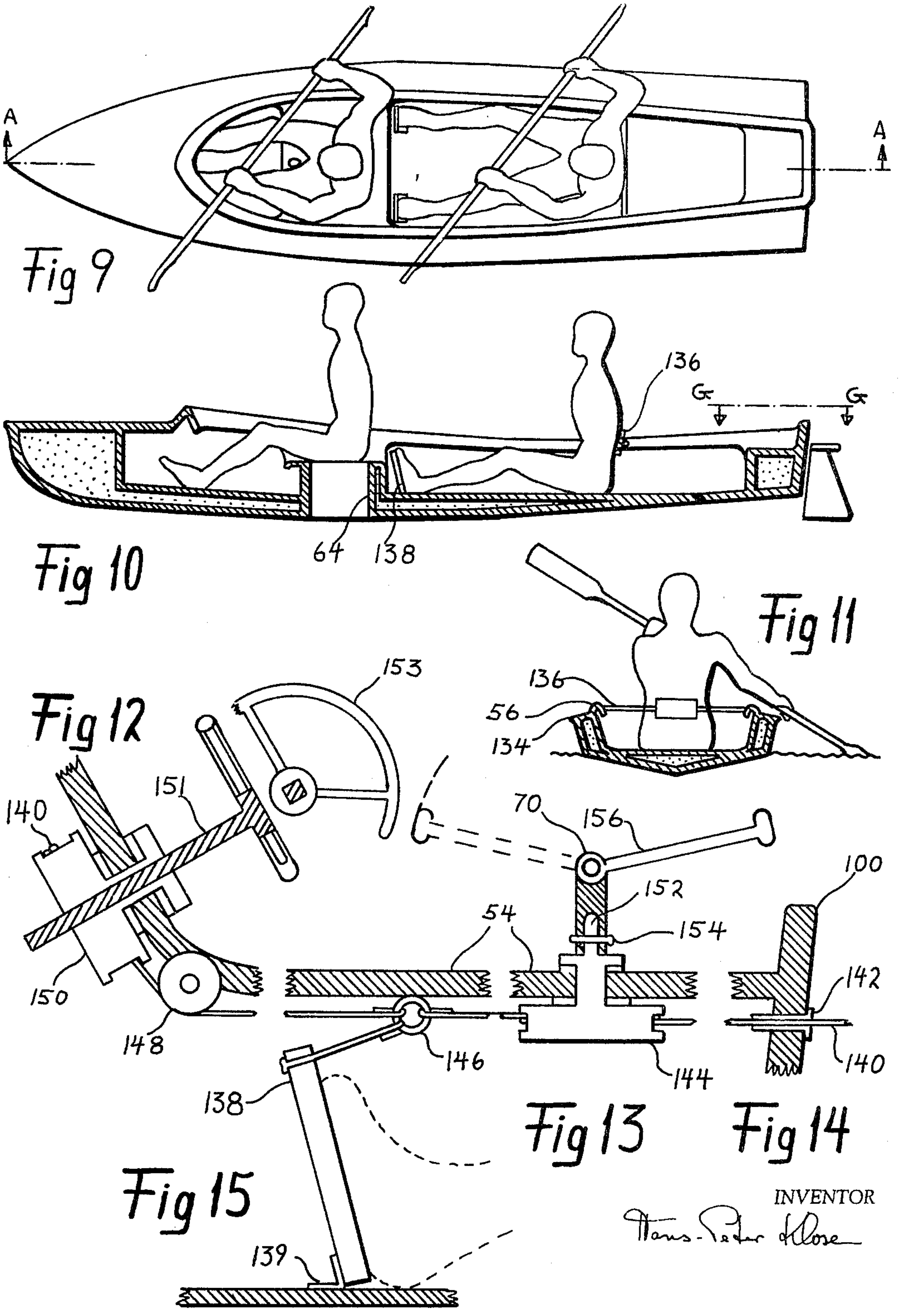
FIGURES 9, 10 and 11 show the boat being used as a kayak with FIGURE 9 showing the position of two passengers while using kayak paddles.
Figure 16:
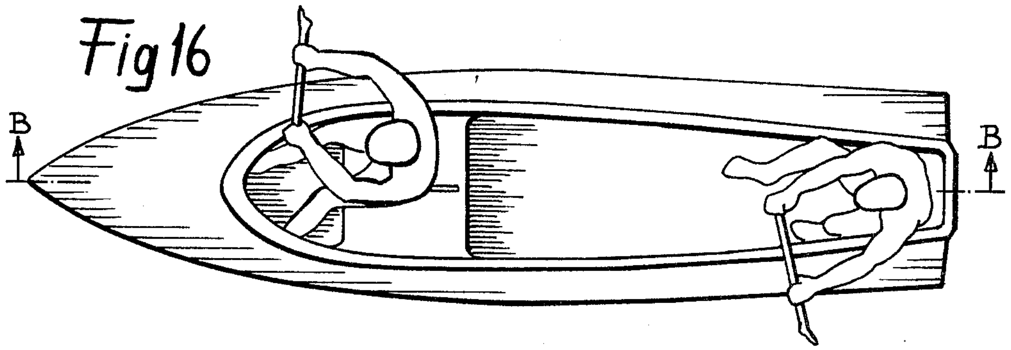
Figure 17:
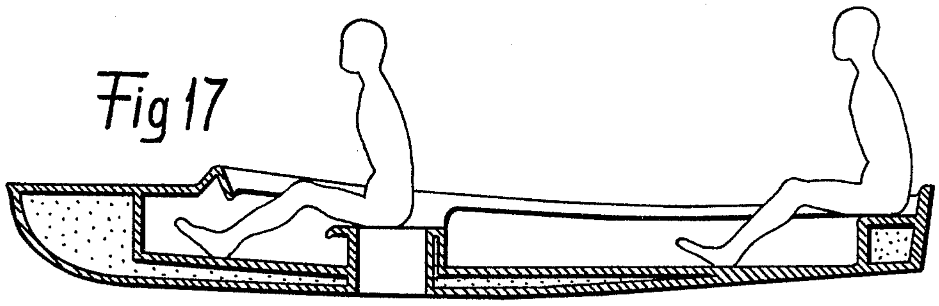
Figure 18:
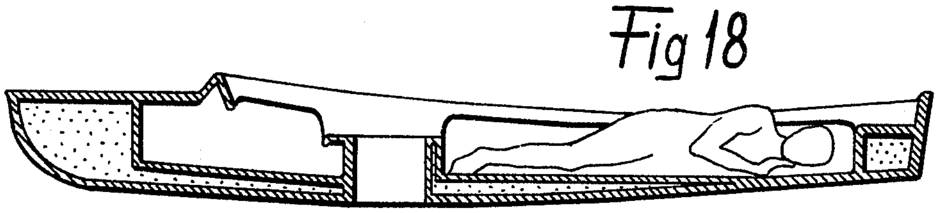
Figure 19:
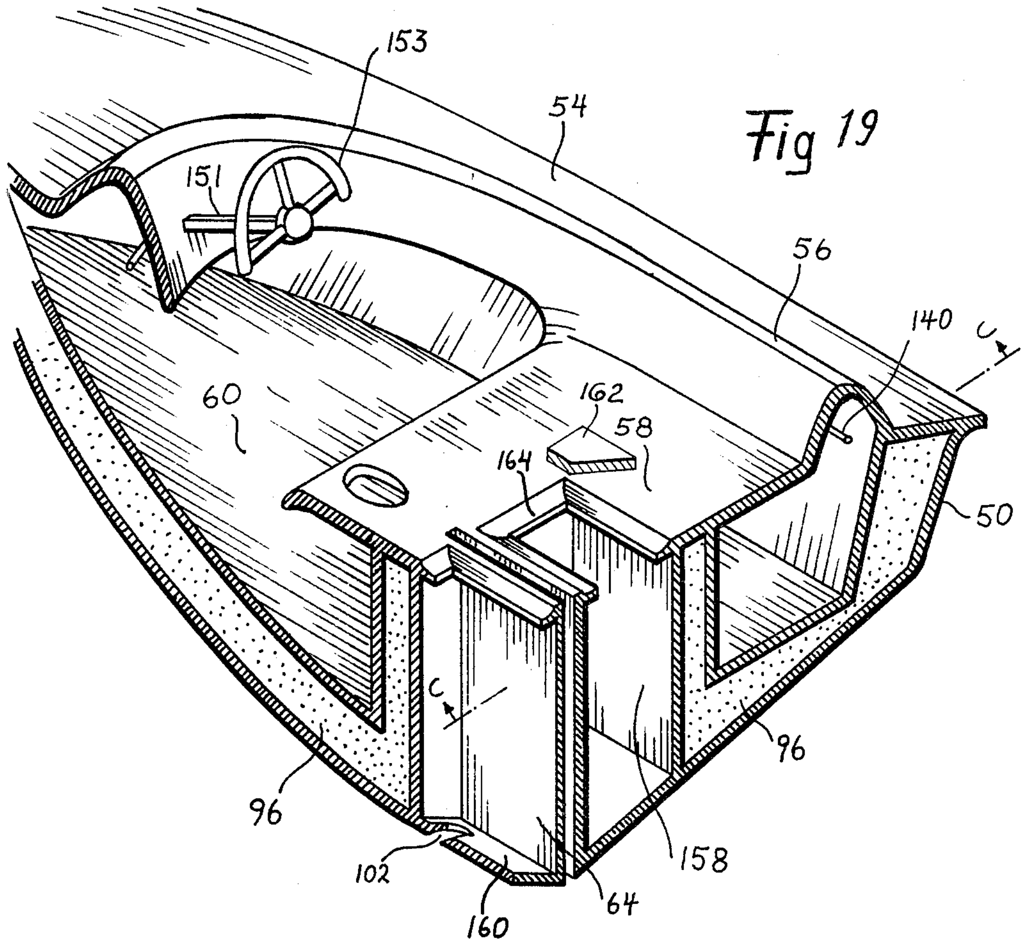
Figure 20:
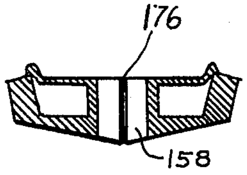
Figure 21A:
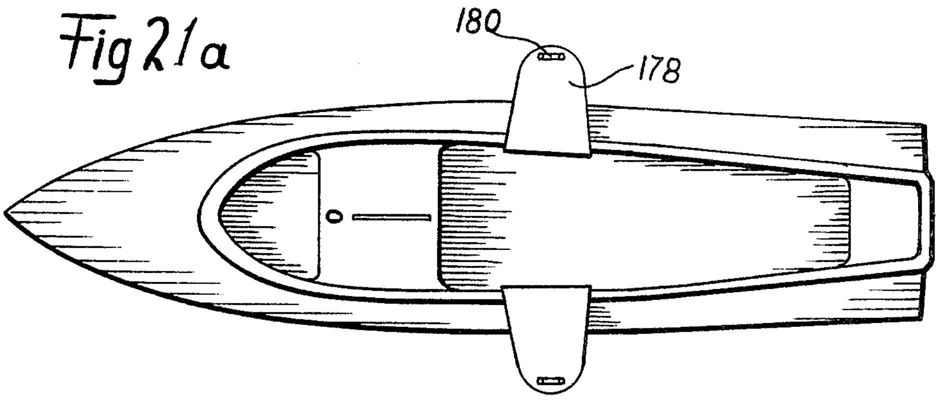
Figures 22, 23, 24, 25:
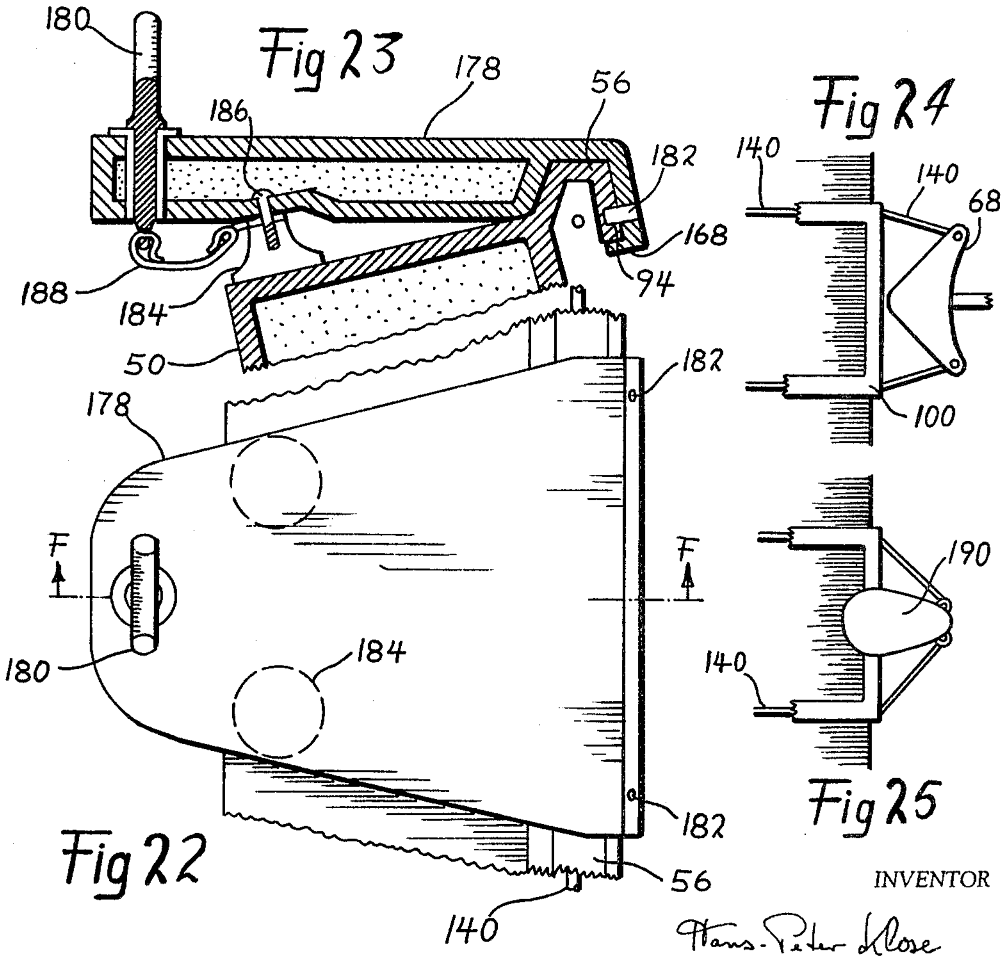
Figure 26:
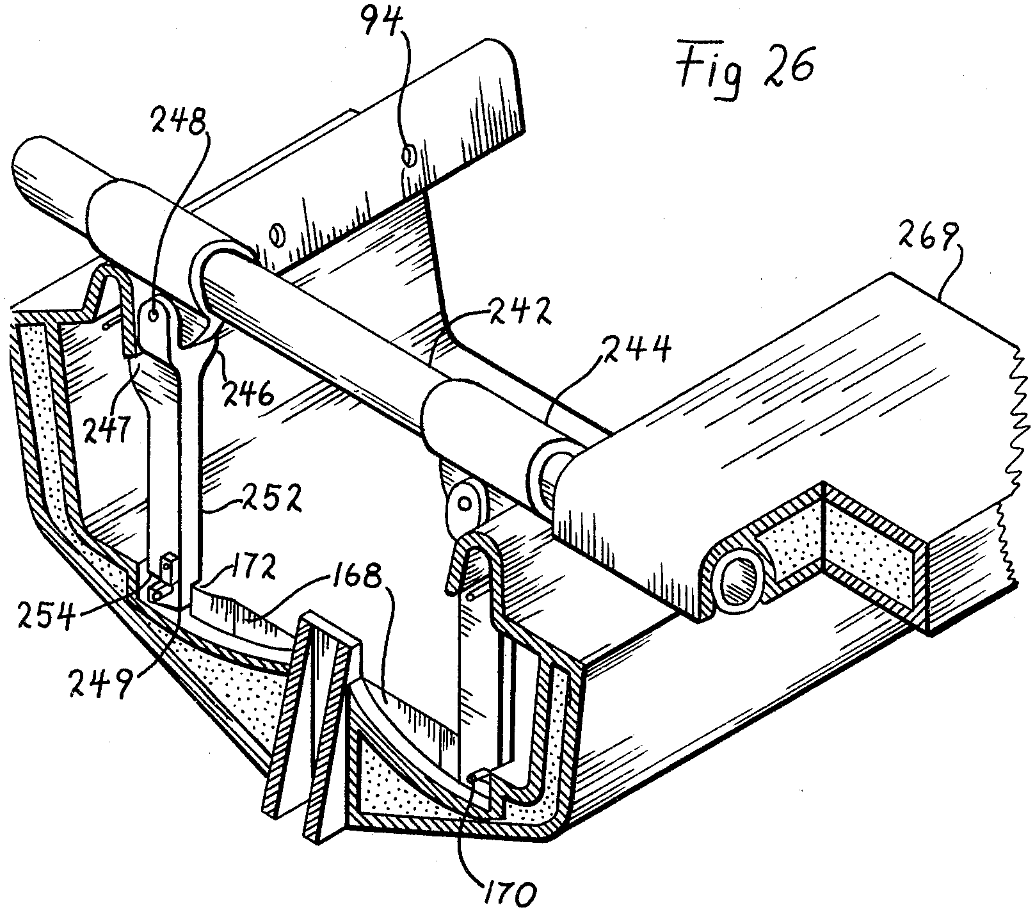

FIGURES 12, 13, 14 and 15 taken together show a condensed view of the various steering control means and their relation to each other;

FIGURE 12 is a side view in partial section of the forward mounted steering wheel apparatus;

FIGURE 13 is a side view in partial cross-section of the side mounted tiller control handle;

FIGURE 14 is a side view in partial section through the transom showing the tiller rope passing through;

FIGURE 15 is a side view in partial section showing the rudder foot control and its connection to the tiller rope;

FIGURE 16 is a top view of the boat while being used as a canoe showing the position of two passengers therein;

FIGURE 17 is a side view in partial cross section along line BB of FIGURE 16 showing the position of two passengers while kneeling and paddling the boat as a canoe;

FIGURE 18 is a side view in partial section showing the available room for a passenger to sleep on board the boat;

FIGURE 19 is an oblique view of the center thwart in partial cross section showing the mast socket, steering wheel, daggerboard trunk, bait box and sandwich construction;

FIGURE 20 is an end view in cross section along line CC of FIGURE 19 showing the bait box and the daggerboard trunk plug in place;

FIGURE 21*a* is a top view of the hull showing the oarlocks in place;

FIGURE 22 is an enlarged top view of the oarlock accessory assembly enlarged from FIGURE 21*a*;

FIGURE 23 is an end view in cross section along line FF of FIGURE 22 showing the construction of the oarlock accessory assembly;

FIGURES 24 and 25 show alternate methods of attaching the tiller rope to the rudder or to an outboard motor;

FIGURE 26 is an oblique partial section of the hull of the readily detachable apparatus for securing an outrigger pontoon support pipe to the hull.

Returning now in detail to the drawings wherein like numerals designate like parts throughout the several views, a preferred embodiment of this invention will now be considered. In this preferred embodiment the hull is of sandwich Fiberglas construction with a non-absorbing part of plastic foam resin material filling the void between the two Fiberglass walls. The hull has an overall length of approximately 14′ and a beam of approximately 3′8″ with a draft of approximately 4″ with the daggerboard retracted and a draft of about 2′6″ when the daggerboard is extended to its lowest position. The sail area is approximately 95 square feet divided between 62 square feet for the mainsail and 33 square feet for the fore triangle. The mast has a height of approximately 18′6″.

In small sailboat design naval architects draw the limit of the ratio of water line length to beam at 3 to 1 and ideally not more than 2.5 to 1. If the length is any more than three times the beam it is considered that the boat will be excessively tippy and unsuitable for safe sailing. Such ratio is usually only used on canoes and kayaks. In this connection, see Fast Boats, John Teale, page 74 and 77. Thus, the trend in the art has been to build wider or "beamier" boats with "planing" hulls. These boats accomplish stability through their width and attempt to cut down on the accompanying water resistance (to increase speed) by keeping as much bottom surface as possible well above water contact. Thus, the wet surface of the boat tends to be rather wide for its length (bulky) with less than 50% of the chine in water contact or parallel to the water when the boat is floating without load. Such a boat leaves a wide "track" or path as it moves through the water. In this type of boat stability can only be increased through a loss in speed under most conditions. The ratio of beam to transom is at least 2 to 1.

The present invention represents a direct departure from the trend in the art. Stability is accomplished through use of a hard chine which is water contact or parallel to the water when the boat is floating without load for more than 50% of the length of the center water line. The chine runs almost parallel to the center line of the boat. Because of the great stability gained through such construction, the boat can be made relatively narrow and still not be tippy. Thus, the length to beam ratio can be much greater than the "ideal" of 2.5 to 1. A ratio of 3 or 4 to 1 has been found quite satisfactory and in one embodiment a ratio of between 3.3 and 3.8 is used. The present preferred embodiment has a length of 14 feet and waterline beam of 3′8″, giving a ratio of about 3.8 to 1. More than 8 feet of the chine is parallel with the water surface when the boat is floating without load and in a preferred embodiment approximately 10 feet of chine was parallel with the water under such conditions. With such construction the boat would not capisze when a weight greater than the boat's own weight was placed on the extreme outside of the deck at the beam.

This construction is very unusual in sailboats because it is usually considered necessary to have the chine rise both forward and aft to minimize the water contact. The aft chine rise is usually considered critical so as to lessen the water drag near the transom.

In conventional sailboats the width of the transom is usually very much smaller than the beam, the beam to transom ratio usually being about 2 to 1. In the present invention the transom width is more nearly equal to the beam, that is between 1 to 1 and 1.5 to 1, with a preferred embodiment having a ratio of 1.25 to 1. This is unusual and normally would result in a drag at the transom. This is overcome by the flat planing design and the possibility of moving the passengers well forward for weight balance, since the daggerboard trunk is moved forward due to the rearwardly curved daggerboard.

Overall the hull of the present invention has a flat planing bottom with a sharp V forward. The forward part of the hull (forwards of the daggerboard trunk) has a dead rise (angle above the horizontal measured from the centerline toward either side) of about 12° near the trunk tapering to a very sharp V where the bow contacts the water under normal circumstances. Vertically above this point the sides flare sharply outwardly to deflect the water and, at the same time, furnish a lifting motion.

From the daggerboard trunk aft the deadrise gradually decreases to about 4° to 9° at the transom with a preferred embodiment having a deadrise aft of about 60°. Thus, the bottom of the hull is quite flat to planing surface which gives great stability and at the same time high speed since, due to its width it leaves a narrow "track" as it moves through the water.

The sides of the boat of this invention are nearly vertical, that is at angle of about 90° to the surface of the water in which the boat is floating, with more than two-thirds of the center water line length being at angle of more than 80° with an outward flare at its top.

Figures 1, 2, 3, 3A:
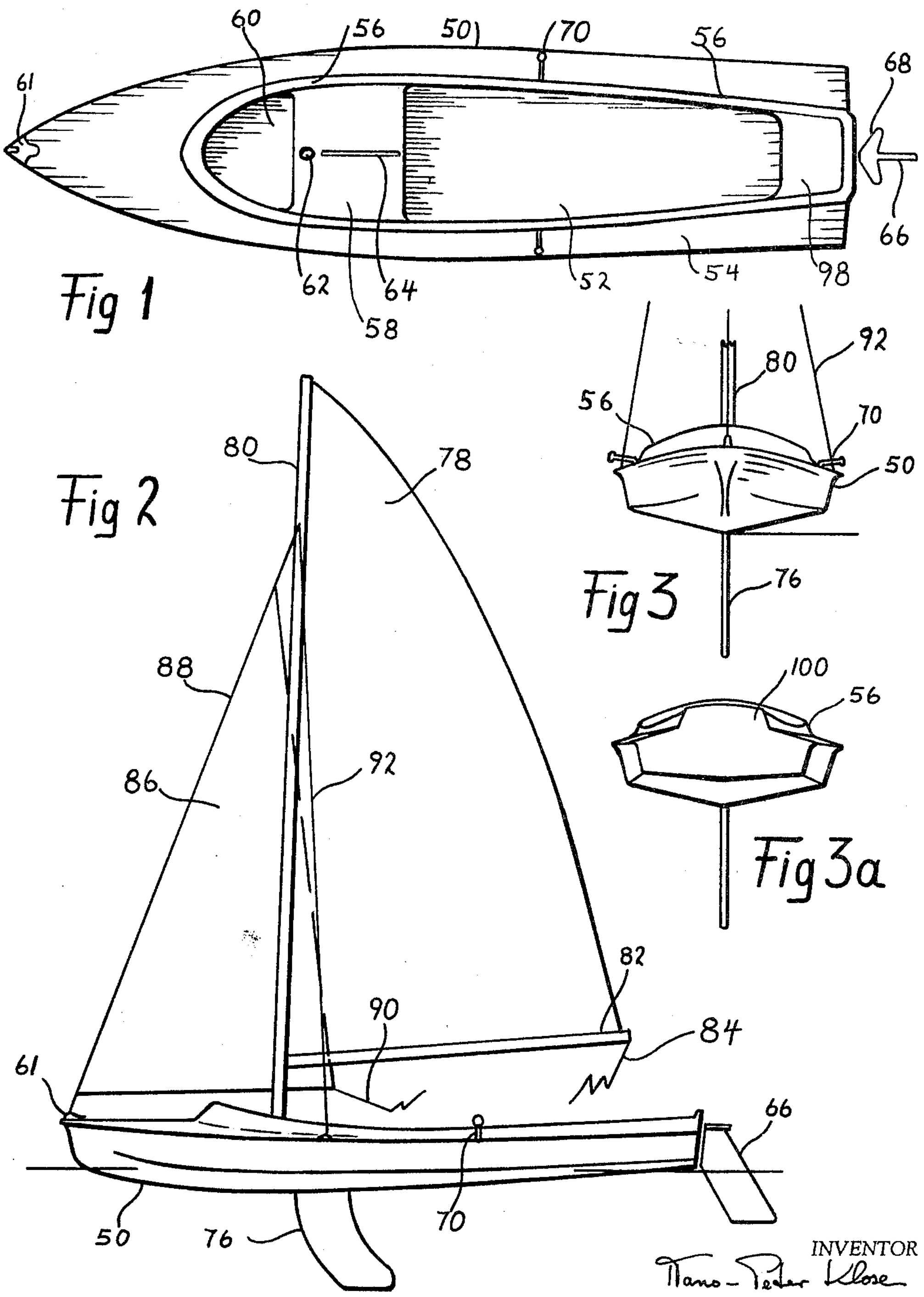
FIGURE 1 is a top plan view of the hull as it appears when used for sailing.
FIGURE 2 is a view in side elevation of the boat when rigged for sailing, showing the position of the daggerboard in relation to the mast.
FIGURE 3 is a partial front view showing the general configuration of the hull.
FIGURE 3A is a partial rear view showing the hull of FIGURE 3.

Returning now to FIGURE 1 in greater detail, the hull 50 has a passenger compartment or main cockpit 52 and forward cockpit 60 surrounded by sections of the deck 54 and enclosed by a coaming 56. The cockpit is protected from the entry of water or waves breaking over the front deck by the curved forward part of a coaming 56. The rearward outline (or limit) of the forward cockpit 60 is formed by the center thwart 58. In the forward section of the center thwart 58 is the mast hole 62 from which the mast is supported. Behind the mast hole is the daggerboard trunk 64 which is adapted to receive a removable curved daggerboard 76 as shown in FIGURE 2 and runs flush with the top of the thwart 58. At the stern of the hull 50 is the rudder 66 and the rudder yoke 68 which are controlled by the side tiller handles 70 through a system of pulleys and tiller ropes to be described later in greater detail.

Figures 4, 8:
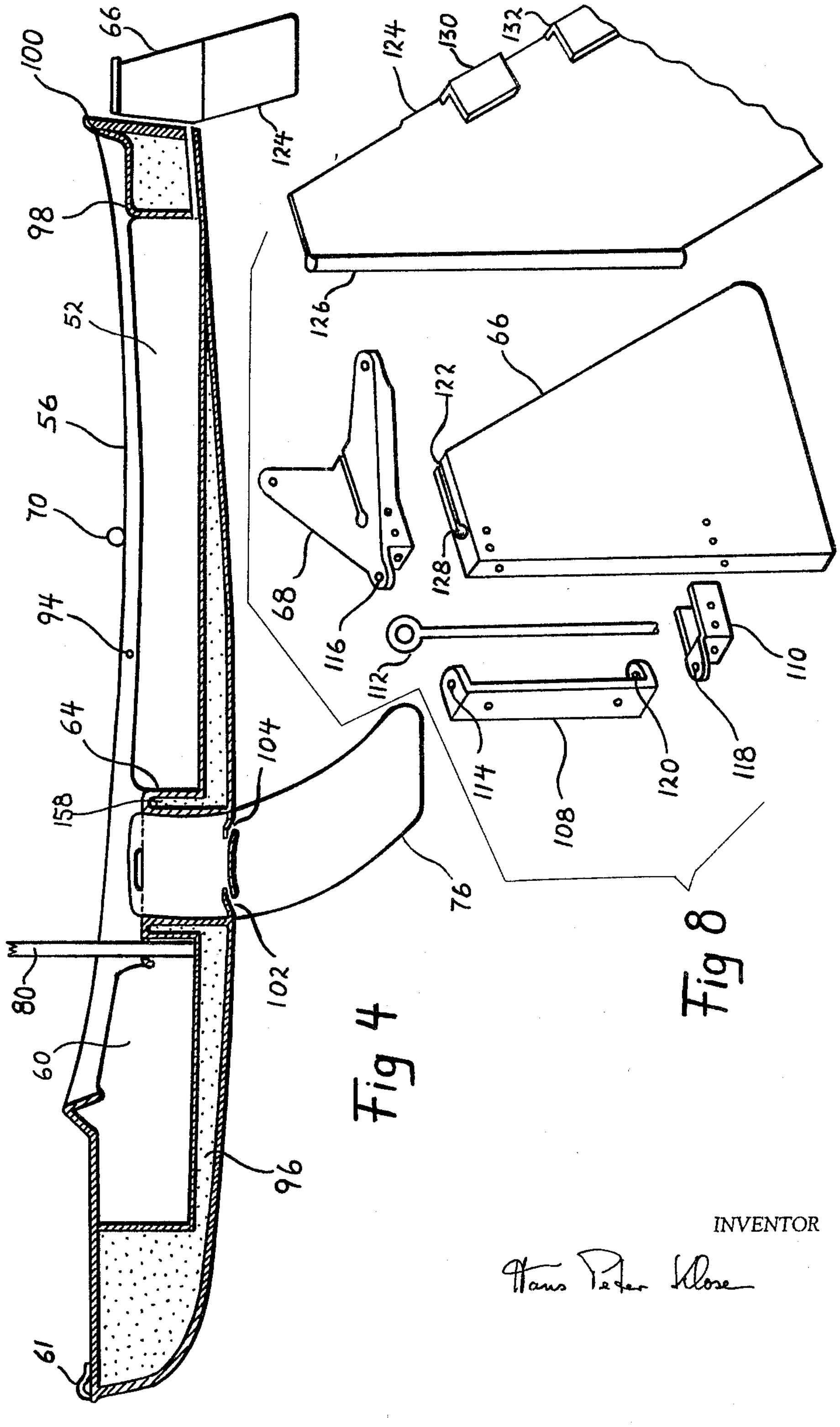
FIGURE 4 is a sectional side view of the hull with the accessories mounted for sailing.
FIGURE 8 is an exploded view of the rudder assembly showing the hardware and detachable rudder extension.

Referring now to FIGURE 2 the mainsail 78 is supported by the mast 80 and the boom 82 and controlled by the main sheet 84, the jib sail 86 is supported along its forward edge by fasteners sliding on the mast forestay 88 and controlled by the jib sheet 90. The mast 80 is further secured rigidly in place by use of sidestays or shrouds 92 as shown in FIGURE 3. Referring now to FIGURE 4 the position of the curved daggerboard 76 when inserted in the daggerboard trunk 64 is clearly shown, as is its relation to the position of the mast hole 62 and the mast 80. This relationship represents an important part of the contribution of this invention since with the use of a curved daggerboard it is possible to move the daggerboard trunk considerably farther forward in the cockpit thus giving a greater amount of space available for the passengers and still have the daggerboard readily removeable and adjustable. At the same time this location enables the center of the daggerboard to be located under the center of lateral resistance of the boat because it is necessary to keep this center of lateral resistance approximately 6% of the water line length aft of the center of effort of the sails in accordance with standard sail boat balance design practice.

The evenly spaced holes 94 along the inside edge of the coaming 56 are used to adapt a variety of accessories to fit securely on the hull. FIGURE 4 also shows the sandwich Fiberglas construction of the hull 50 which is filled with a non-water absorbent foam resin material such as polyurethane to give complete flotation even though the boat may be capsized and submerged underwater. This sandwich Fiberglas construction is well known to those skilled in the art and is accomplished through first establishing two walls to build a container with a void between the walls, the pouring a mixture of a polyether resin and a catalyst propellant into the void which will subsequently react, foam, expand and fill the void with a foam that adheres to the walls.

Note that the aft thwart 98 is moulded into the transom 100 and into the coaming 56 to ensure structural strength for the transom. The transom 100 is designed to be high enough and rigid enough to permit the attachment of a standard outboard motor of at least 5 h.p. FIGURE 4 also shows an inlet 102 and an outlet 104 for circulating water flowing through the bait box 158.

Figure 5:
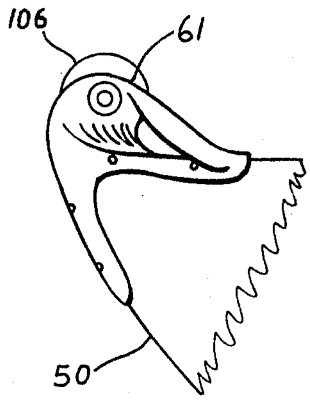
FIGURE 5 is a side view of the combination bow handle and roller.
Figure 6:
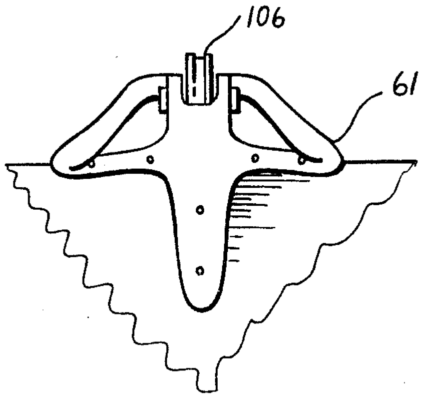
FIGURE 6 is a front view of the combination bow handle and roller.
Figure 7:
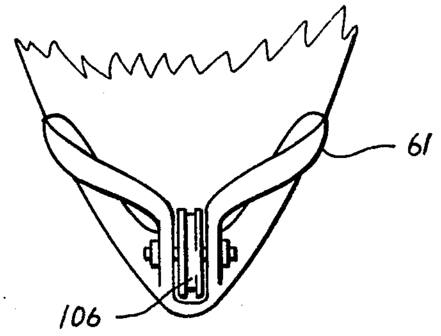
FIGURE 7 is a top view of the combination bow handle and roller showing the curvature of the handles.

FIGURES 5, 6 and 7 show the unique design of the bow handle which enables a person to comfortably lift and grip the front of the boat as well as providing the support and axle for the support roller 106. This roller is used to support the boat as it is rolled up the car top carrier.

Referring now to FIGURES 9, 10 and 11 which show the boat hull being used as a kayak it can be seen from FIGURE 11 how the width of the boat as described in this preferred embodiment is ideally suited to use as a kayak. Though of sufficient width to obtain a maximum of stability the design is narrow enough to permit the use of a standard double-ended kayak paddel by an operator of normal size in such a manner that his arms or hands never need come in contact with the coaming or the gunnel 134 of the boat. The position of the swivel back rest 136 in relation to an ordinary sized man while in the kayak paddling position is also shown in FIGURE 11. In FIGURE 10 the position of the foot control pedal 138 is also shown in relation to a paddler's foot. The details of the foot pedal and the rest of the steering system are clearly shown in FIGURES 12, 13, 14 and 15. A tiller rope 140 runs from one of the arms of the rudder yoke 68, through a bushing 142 in the transom 100, this bushing being made of nylon or some other noncorrosive substance which will form a water-tight seal with a free slipping surface for the rope to pass through, then twice around the side tiller steering drum 144 then to a splicing ring 146, then to a pivot pulley 148, then to the steering wheel drum 150, then down the opposite side of the boat, passing through similar apparatus along this opposite side until the tiller rope once again returns to the other side of the rudder yoke 68. Thus through the motion of any one of the steering controls, i.e., the side tiller handle, the foot control, or the steering wheel, the rudder may be made to turn in any desired direction to steer the boat. Each steering control will now be discussed in detail.

The side tiller 70 is equipped with a drum 144 underneath the deck 54 with two convolutions of the tiller rope wound thereover, a shaft secured to the drum and extending through the deck to an external post 152 secured to the shaft by means of a conveniently removable pin 154 and an easily pivotable handle grip 156. This side tiller handle is similarly duplicated on the opposite side of the boat so that an operator may steer the boat from either side as may be required. Pushing on the foot pedal 138 which is pivotally mounted to the floor by means of a hinge 139 causes the splicing ring 146 and the tiller rope 140 to move to the left as viewed in FIGURE 15. This is the same action as though the tiller handle had been turned. Pushing the left pedal will cause the boat to turn left and pushing the right pedal will cause the boat to turn right, at the same time causing the left pedal to move upwardly. Thus the pair of foot pedals work in a push-pull relationship to each other. The steering wheel 153 operates in a manner similar to that of the side tiller 70.

FIGURES 16 and 17 as previously explained are intended only for illustrative purposes to show how two paddlers can be easily accommodated in the cockpit of the boat when it is used as a canoe. FIGURE 16, a top view of the boat shows how the width of approximately 3′8″ is ideally adapted for this multi-purpose use allowing ample width to ensure resistance from tipping and at the same time being narrow enough so that an average sized man can easily manipulate a canoe paddle without difficulty. FIGURE 17 is a side view showing the position of the paddler's legs and feet in the cockpit of the boat while canoeing. Note that the center thwart 58 and aft thwart 98 may also be used as a convenient seat for the paddlers. The swivel back 136 also may be used as a convenient seat by the paddlers. FIGURE 18 is a side view in section to show the ample room inside the boat so that at least one person may conveniently sleep on the boat overnight with the rod or mast 80 resting across the top of the cockpit to act as a support for a canvas cover which may be placed over both cockpits to protect them from the weather.

FIGURE 19 shows the sandwich construction of the bottom and sides of the hull and the bait box with the interior space filled with a bouyant material as previously described. The bait box 158 has an inlet 102 for flowing water through compartments 160. There may be one single compartment or two or more compartments which may be interconnected in one of the areas under the thwart or deck. A lid 162 rests on a rim 164 which is somewhat below the surface of the center thwart surface 58 of which it is a part. It should be noted in conjunction with FIGURE 20 that the steering wheel shaft 151 is of square cross section having a sliding frictional fit in the steering drum 150 (see FIGURE 12) so that the steering wheel 153 and shaft 151 may be moved in and out of the drum to adjust to a driver's convenience or may be pulled out completely to be stored away when not in use.

FIGURE 20 is intended primarily to show the position of the daggerboard trunk in relation to the bait box 158 and also to show the daggerboard trunk plug 176 in position in the daggerboard trunk. This plug is used whenever the daggerboard is not in place, e.g. when the boat is not being used as a sailboat and it has a flat surface at its top to form a convenient seat and to completely seal off the daggerboard trunk so that no small articles can falls into the space. Note that this plug has a widened portion 176 at its top and bottom to ensure a tight fit in the daggerboard trunk to prevent water from being forced up the daggerboard trunk when the boat is moving at a high speed and also to prevent lateral movement of the plug while the boat is under way.

FIGURE 21*a* shows the boat of this invention when rigged to be used as a rowboat. An oarlock accessory assembly 178 is secured to the boat by means clearly shown in FIGURE 23. In FIGURE 23 it can be seen that the oarlock accessory assembly 178, supporting a standard oarlock 180, is held in place in the coaming 56 by an extension 168 and a pin 182 which is secured to the inside edge of the oarlock assembly and registers in a hole 94, one of a plurality of holes which are placed equal distance apart along the inside edge of the coaming on both sides of the boat. Thus, this oarlock assembly can be mounted anywhere along the side of the boat, so that more than one set of oars can be used and the three pins 182 (see FIGURE 22) will register with three of the holes in the coaming at any place along the edge of the boat. The assembly 178 is supported against downward movement by a suction cup 184 which is secured to the assembly by a screw 186 which also secures a flexible lead 188 which is in turn threaded through the end of the oarlock 180 to prevent its becoming lost and, at the same time, permitting pivotal movement as the oars are rowed. FIGURES 24 and 25 are top views looking along lines GG of FIGURE 10 showing the manner in which the tiller rope 140 is fastened either to the rudder yoke 68 or to an outboard motor 190. The tiller rope is moved in the manner previously described by either the side tiller handle, the foot control or the steering wheel.

Accessory pontoons may be secured to the boat through pieces of 2″ aluminum tubing approximately 8′ long with the fastening devices shown in FIGURE 22. The outrigger support pipes 242 pass through the pipe holders 244 which are cylindrical aluminum sleeves pivotally mounted and having a downwardly projecting ear which presents a pin protruding outwardly towards the inside edge of the coaming to engage one of the plurality of equally spaced holes 94 previously discussed. A pivot pin 248 passes through the U-shaped end of the bracket 252 and through the ear 246 so that the bracket 252 is pivotally mounted thereto. When the pair of pontoons is floated in position along side of the boat so that the connecting tube 242 passes over the top of the coaming it is a simple matter to position the ear 246 in front of one of the holes 94 and swing the bracket 252 down into the cockpit of the boat so that the slot 254 slides over the pin 170 to be firmly held in place by the offset 172. The shoulder 247 then presses up underneath the coaming to clamp it firmly between the sleeve 244 and the shoulder 247. A locking wedge 249 pivotally mounted on the bracket 252 drops into place between the edge of the slot 168 and the bracket to hold it securely in place. In a similar manner the other hold-down brackets 252 are swung into place and locked so that the pontoon assembly and hull become one integral unit. The boat is then ready for use as an outrigger sailboat kayak or motorboat. The outrigger pontoons may also be used in connection with an outboard motor. This is especially desirable in extremely rough or choppy weather where maximum stability is desired as well as for using heavier motors and higher speeds.

While a particular embodiment of this invention has been illustrated and described, it will be understood, of course, that the invention is not to be limited thereto, since many modifications may be made, and it is contemplated therefore by the appended claims to cover any such modifications as fall within the true spirit and scope of this invention.

What is claimed is:

1. A multi-purpose boat of suitable length and width for use as a one to four passenger sailboat, rowboat, motorboat, canoe or Kayak comprising in combination a single integral one-piece hull having a daggerboard trunk in said hull forward of said hull's center of lateral resistance adapted to receive a removable rearwardly curved daggerboard, guiding means in said trunk to guide said daggerboard so that when in place said daggerboard is curved rearwardly to supply its lateral resistance approximately under the boat's center of lateral resistance, fastening means integral with said boat to receive a plurality of interchangeable accessory means to adapt said boat for use with a plurality of propulsion means and steering control means.

2. The boat of claim 1 wherein said fastening means comprises an inverted U-shaped coaming on the edge of the cockpit of said boat the inner depending leg of the U being provided therein with a plurality of spaced openings surrounded by solid material for receiving in engagement into at least one of said openings a stud protruding from said accessory means to hold said accessory means in place when positioned on said coaming.

3. The boat of claim 1, wherein said hull is of a sandwich construction along each side thereof, having an inner Fiberglas side panel and a spaced apart Fiberglas outer side panel, the space therebetween being filled with a non-water absorbent foam material which adheres to said Fiberglas.

4. A multi-purpose boat of suitable length and width for use by one to four passengers comprising in combination a single integral one-piece hull having a daggerboard trunk in said hull forward of said hull's center of lateral resistance adapted to receive an easily removable rearwardly curved daggerboard, securing means forward of said trunk to receive at least one mast for supporting at least one sail, a daggerboard, said daggerboard being curved rearwardly so that when in place it supplies its lateral resistance to the boat's center of lateral resistance slightly aft of the center of effort of the sail area supported by said mast, fastening means integral with said hull to receive a plurality of interchangeable accessory means to adapt said hull for use with a plurality of propulsion means and steering control means.

5. A multi-purpose boat comprising a hull having:

(a) a waterline length to beam ratio greater than 3.5 to 1;

(b) a hard chine having more than 50% of its length substantially parallel to, and slightly above contact with, water in which the boat is floating without load;

(c) a beam to transom width ratio between 1 and 1.5;

(d) a dead rise of more than 15° forward, less than 15° amidship and less than 7° aft; said boat being of a length and width suitable for use by one to four passengers and fastening means integral with said hull to receive a plurality of interchangeable accessory means to adapt said hull for use with a plurality of propulsion means and steering control means.

6. The boat of claim 5, including a daggerboard trunk in said hull forward of said boat's center of lateral resistance adapted to receive a rearwardly curved daggerboard.

7. The boat of claim 6, including securing means forward of said trunk to receive at least one mast for supporting at least one sail, a daggerboard adapted to be received in said trunk, said daggerboard being curved rearwardly so that when in place it supplies its lateral resistance slightly aft of the center of effort of the sail area supported by said mast.

8. The boat of claim 5, wherein said fastening means comprises an inverted U-shaped coaming on the edge of the cockpit of said boat, the inner depending leg of the U being provided therein with a plurality of spaced openings surrounded by solid material for receiving in engagement into at least one of said openings, a stud protruding from said accessory means to hold said accessory means in place when positioned on said coaming.

9. The boat of claim 5, wherein said accessory means comprises a clamp for securing a support pipe for an outrigger pontoon to said hull comprising a collar means to engage said support pipe, at least one stud protruding from said collar means to engage an opening in the coaming surrounding the cockpit of said boat, an arm pivotally mounted from said collar means to engage said coaming and at least one other point on said boat to hold said collar means firmly in contact with said boat.

10. A multi-purpose boat of suitable length and width for use as a one to four passenger sailboat, rowboat, motorboat, canoe or Kayak comprising in combination a single hull having a daggerboard trunk in said hull forward of said hull's center of lateral resistance adapted to receive a removable rearwardly curved daggerboard, guiding means in said trunk to guide said daggerboard so that when in place said daggerboard is curved rearwardly to supply its lateral resistance approximately under the boat's center of lateral resistance, fastening means integral with said boat comprising an inverted U-shaped coaming on the edge of the cockpit of said boat the inner depending leg of the U being provided therein with a plurality of spaced openings surrounded by solid material for receiving in engagement into at least one of said openings a stud protruding from said accessory means to hold an oarlock pivotally mounted upon a support, said support having one end bent to a shape complementary to that of said coaming and having at least one resilient support means outboard of said bent end to engage said boat to prevent vertical movement of said oarlock support.

11. A multi-purpose boat of suitable length and width for use by one to four passengers comprising in combination a single hull having a daggerboard trunk in said hull forward of said hull's center of lateral resistance adapted to receive an easily removable rearwardly curved daggerboard, securing means forward of said trunk to receive at least one mast for supporting at least one sail, a daggerboard, said daggerboard being curved rearwardly so that when in place it supplies its lateral resistance to the boat's center of lateral resistance slightly aft of the center of effort of the sail area supported by said mast, an inverted U-shaped coaming on the edge of the cockpit of said boat adapted to receive an oarlock pivotally mounted upon a support, said support having one end bent to a shape complementary to that of said coaming and presenting at least one stud projecting inwardly from bent end to engage openings in said coaming and having at least one resilient support means outboard of said bent end to engage said boat to prevent vertical movement of said oarlock support.

References Cited by the Examiner

UNITED STATES PATENTS

| | | | |
|---|---|---|---|
| 677,932 | 7/1901 | Berry | 9—26 |
| 1,257,073 | 2/1918 | Frank | 9—1 |
| 2,635,575 | 4/1953 | Carrier | 114—167 |
| 2,915,031 | 12/1959 | Johnston | 9—6 |
| 2,926,363 | 3/1960 | Madlem | 9—6 |
| 2,949,879 | 8/1960 | Kehn | 114—185 |
| 3,001,502 | 9/1961 | Stoker | 114—167 |
| 3,129,443 | 4/1964 | Maturi et al. | 9—2 |
| 3,141,435 | 7/1964 | Moffitt | 9—2 |

MILTON BUCHLER, *Primary Examiner.*

T. MAJOR, *Assistant Examiner.*